United States Patent
Yang et al.

(10) Patent No.: US 12,177,238 B2
(45) Date of Patent: Dec. 24, 2024

(54) METHOD, APPARATUS, ELECTRONIC DEVICE, AND MEDIUM FOR DETECTING ABNORMALITY IN NETWORK

(71) Applicant: Dell Products L.P., Round Rock, TX (US)

(72) Inventors: Wenbin Yang, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 17/685,823

(22) Filed: Mar. 3, 2022

(65) Prior Publication Data

US 2023/0231862 A1 Jul. 20, 2023

(30) Foreign Application Priority Data

Jan. 20, 2022 (CN) .......................... 202210068490.3

(51) Int. Cl.
 *H04L 9/40* (2022.01)
(52) U.S. Cl.
 CPC ................. *H04L 63/1425* (2013.01)
(58) Field of Classification Search
 CPC .................................................. H04L 63/1425
 See application file for complete search history.

(56) References Cited

U.S. PATENT DOCUMENTS

| | | | | |
|---|---|---|---|---|
| 11,317,870 | B1* | 5/2022 | De Sapio | A61B 5/6898 |
| 2018/0109557 | A1* | 4/2018 | Yoo | H04L 47/11 |
| 2018/0152475 | A1* | 5/2018 | Park | G06N 3/088 |
| 2020/0099714 | A1* | 3/2020 | Haridas | G06N 3/088 |

(Continued)

FOREIGN PATENT DOCUMENTS

| | | | | |
|---|---|---|---|---|
| CN | 110138614 A | * | 8/2019 | H04L 41/14 |
| CN | 110941793 A | * | 3/2020 | G06F 17/16 |
| KR | 102006553 B1 | * | 12/2017 | H04L 63/14 |

OTHER PUBLICATIONS

Y.-A. Chung et al., "An Unsupervised Autoregressive Model for Speech Representation Learning," arXiv:1904.03240v2, Jun. 19, 2019, 5 pages.

(Continued)

*Primary Examiner* — Bassam A Noaman
(74) *Attorney, Agent, or Firm* — Ryan, Mason & Lewis, LLP

(57) ABSTRACT

Embodiments of the present disclosure provide a method, an apparatus, an electronic device, and a medium for detecting an abnormality in a network. The method for detecting an abnormality in a network includes acquiring a reference tensor and a target tensor representing traffic in the network, the reference tensor and the target tensor having at least dimensions of source, destination, and time of the traffic. The method further includes determining a target core tensor of the target tensor based on a reference decomposition factor of the reference tensor related to the dimensions of source and destination of the traffic. The method further includes determining that there is an abnormality in the network if a difference between the target core tensor of the target tensor and a reference core tensor of the reference tensor is greater than a preset value.

20 Claims, 5 Drawing Sheets

(56) References Cited

U.S. PATENT DOCUMENTS

2020/0336499 A1* 10/2020 Kulkarni ............... G06F 18/29

OTHER PUBLICATIONS

Y. Wang et al., "Global Convergence of ADMM in Nonconvex Nonsmooth Optimization," arXiv:1511.06324v8, May 30, 2018, 33 pages.
J. Kossaifi et al., "TensorLy: Tensor Learning in Python," arXiv:1610.09555v2, May 9, 2018, 5 pages.
A. Novikov et al., "Tensor Train Decomposition on TensorFlow (T3F)," Journal of Machine Learning Research, vol. 21. Mar. 2020, pp. 1-7.
Y. Pan et al., "TedNet: A Pytorch Toolkit for Tensor Decomposition Networks," arXiv:2104.05018v1, Apr. 11, 2021, 9 pages.
A. Anandkumar, "Tensor Methods for Large-Scale Learning," University of California-Irvine, Machine Learning Symposium, [Video], You Tube, https://www.youtube.com/watch?v=5S40yV6ngEs, May 26, 2016, 4 pages.
C. Yin et al., "TT-Rec: Tensor Train Compression for Deep Learning Recommendation Models," arXiv:2101.11714v1, Jan. 25, 2021, 15 pages.
J. A. Bengua et al., "Efficient Tensor Completion for Color Image and Video Recovery: Low-Rank Tensor Train," IEEE Transactions on Image Processing, Feb. 2017, 14 pages.
A. Lakhina et al., "Diagnosing Network-Wide Traffic Anomalies," Computer Communication Review, vol. 34, No. 4, Aug. 2004, pp. 219-230.
S. Ahmadi-Asl et al., "Randomized Algorithms for Computation of Tucker Decomposition and Higher Order SVD (HOSVD).": IEEE Access, arXiv:2001.07124v4, Jul. 9, 2021, 23 pages.
Z. LV et al., "Interaction of Edge-Cloud Computing Based on SDN and NFV for Next Generation IoT," IEEE Internet of Things Journal, vol. 7, No. 7, Jul. 2020, 9 pages.
J. Huang et al., "A C++ Library for Tensor Decomposition," IEEE 38th International Performance Computing and Communications Conference, Oct. 2019, 2 pages.
W. Ding et al., "Tensor-based Linear Dynamical Systems for Action Recognition from 3D Skeletons," Pattern Recognition, vol. 77, Dec. 7, 2017, pp. 75-86.
C. Buragohain et al., "FlowTrApp: An SDN Based Architecture for DDOS Attack Detection and Mitigation in Data Centers," 2016 3rd International Conference on Signal Processing and Integrated Networks, Feb. 2016, pp. 519-524.

* cited by examiner

METHOD, APPARATUS, ELECTRONIC DEVICE, AND MEDIUM FOR DETECTING ABNORMALITY IN NETWORK

RELATED APPLICATION(S)

The present application claims priority to Chinese Patent Application No. 202210068490.3, filed Jan. 20, 2022, and entitled "Method, Apparatus, Electronic Device, and Medium for Detecting Abnormality in Network," which is incorporated by reference herein in its entirety.

FIELD

Embodiments of the present disclosure relate to the field of computer networks, and more particularly, to a method, an apparatus, an electronic device, a medium, and a computer program product for detecting an abnormality in a network.

BACKGROUND

Software-defined network (SDN) is a novel network architecture and an implementation of network virtualization. SDN separates a programmable control plane of a network device from a data plane, achieving flexible control of network traffic and making the network smarter. In SDN, network intelligence is logically located within the control plane, while the network device acts as a data packet forwarding unit of the data plane.

Security of SDN has become an important factor restricting the use and promotion of SDN. Conventional methods use algorithms based on machine learning and statistical models to detect whether a network is under attack or has an abnormality. However, these methods only use low-dimensional data and ignore geometric connection information of network devices, making it difficult to meet the requirements of network security.

SUMMARY

According to embodiments of the present disclosure, a solution for detecting an abnormality in a network is provided.

According to a first aspect of the present disclosure, a method for detecting an abnormality in a network is provided. The method includes acquiring a reference tensor and a target tensor representing traffic in the network, the reference tensor and the target tensor having at least dimensions of source, destination, and time of the traffic. The method further includes determining a target core tensor of the target tensor based on a reference decomposition factor of the reference tensor related to the dimensions of source and destination of the traffic. The method further includes determining that there is an abnormality in the network if a difference between the target core tensor of the target tensor and a reference core tensor of the reference tensor is greater than a preset value.

According to a second aspect of the present disclosure, an apparatus for detecting an abnormality in a network is provided. The apparatus includes a tensor acquisition unit, a core tensor determining unit, and an abnormality determining unit. The tensor acquisition unit is configured to acquire a reference tensor and a target tensor representing traffic in the network, the reference tensor and the target tensor having at least dimensions of source, destination, and time of the traffic. The core tensor determining unit is configured to determine a target core tensor of the target tensor based on a reference decomposition factor of the reference tensor related to the dimensions of source and destination of the traffic. The abnormality determining unit is configured to determine that there is an abnormality in the network if a difference between the target core tensor of the target tensor and a reference core tensor of the reference tensor is greater than a preset value.

According to a third aspect of the present disclosure, an electronic device is provided. The electronic device includes at least one processing unit and at least one memory. The at least one memory is coupled to the at least one processing unit and stores instructions for execution by the at least one processing unit, where the instructions, when executed by the at least one processing unit, cause the electronic device to perform the method according to the first aspect of the present disclosure.

According to a fourth aspect of the present disclosure, a computer-readable storage medium is provided, which includes machine-executable instructions that, when executed by a device, cause the device to perform the method according to the first aspect of the present disclosure.

According to a fifth aspect of the present disclosure, a computer program product is provided. The computer program product is tangibly stored on a computer-readable medium and includes machine-executable instructions that, when executed by a device, cause the device to perform the method according to the first aspect.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
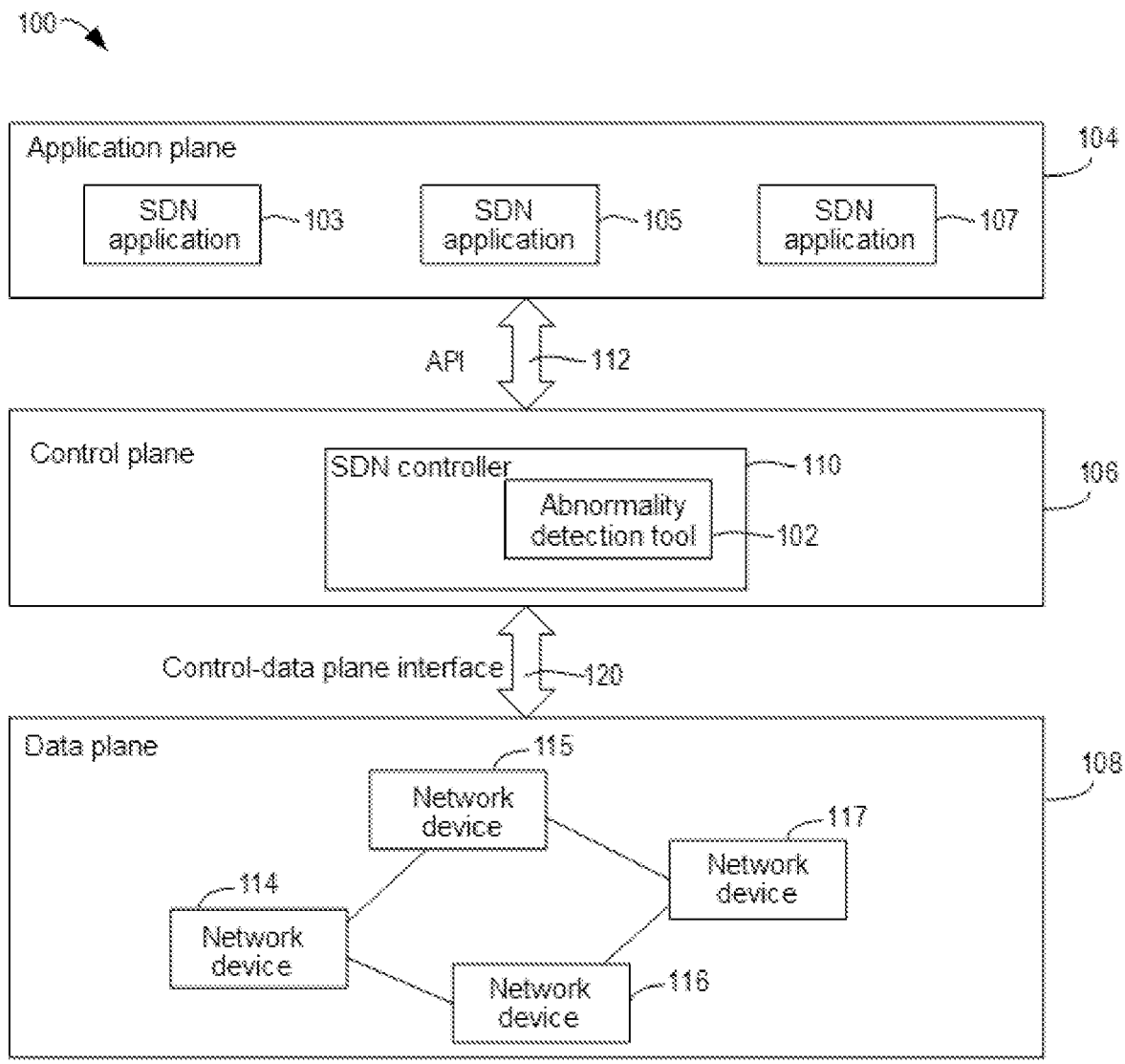
FIG. 1 illustrates a block diagram of an example environment according to some embodiments of the present disclosure.

Embodiments of the present disclosure will be described in more detail below with reference to the accompanying drawings. Although the drawings show certain embodiments of the present disclosure, it should be understood that the present disclosure can be implemented in various forms and should not be construed as being limited by the embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

In addition, all specific numerical values herein are examples, which are provided only to aid understanding, and are not intended to limit the scope.

As described above, a control plane and a data plane in an SDN are separated. A controller located in the control plane may generate a flow table based on a policy and issue the flow table to a network device (such as a switch) in the data plane, so that the network device forwards traffic or data packets based on the flow table (traffic or data packets are sometimes used interchangeably herein). In the SDN, the flow table is the most important data, including all network devices and their topology information, such as source Internet Protocol (IP) addresses, source ports, routing information, destination IP addresses, protocols, etc. Therefore, traffic statistical data in the SDN is multimodal and multidimensional data. This multidimensional data may be organized as tensors.

Conventional methods use methods based on machine learning and statistical models, such as deep learning, support vector machines, and hidden Markov models, to detect whether there is an abnormality in a network. However, these methods do not exploit the high dimension characteristic of SDN network data and ignore geometrical connection information of network devices.

In view of this, a solution for detecting an abnormality in a network is provided. The solution, based on the concept of a dynamic tensor filter, continuously compares traffic statistical data in the tensor form currently to be detected with previous network data over time, thereby determining whether there is an abnormality in the network.

According to an embodiment of the present disclosure, a reference tensor and a target tensor representing traffic in the network are acquired first. Both the reference tensor and the target tensor are multidimensional data and are generated according to traffic statistical data of the network in different time periods with the passage of time. The reference tensor and the target tensor have dimensions of source address, destination address, and time of the traffic. Through tensor decomposition, the reference tensor and the target tensor have their own core tensors and decomposition factors corresponding to the dimensions. A core tensor of the target tensor is then determined based on a decomposition factor of the reference tensor related to the dimension of that other than time. If there is a large difference between the core tensor of the target tensor and a core tensor of the reference tensor, it may mean that the network has been attacked, and it can be determined that there is an abnormality in the network.

It will be understood from the following description that, compared with known conventional solutions, the solution according to embodiments of the present disclosure utilizes network data in a tensor form to dynamically detect an abnormality in a network. This solution is more efficient and robust since tensors maintain intrinsic structural information of high-dimensional data.

Some example embodiments of the present disclosure will be described below with continued reference to the accompanying drawings.

FIG. 1 illustrates a block diagram of example environment 100 according to some embodiments of the present disclosure. Example environment 100 may generally relate to a software-defined network, SDN.

In environment 100, a network control function and a data forwarding function are decoupled. Thus, environment 100 may consist of three different hierarchical planes or layers, including application plane 104, control plane 106, and data plane 108. Application plane 104 may include a plurality of service application programs, such as SDN application 103, SDN application 105, and SDN application 107, which are programs that communicate their needs for network services and desired network behaviors to SDN controller 110 in control plane 106 through one or more corresponding application programming interfaces (APIs), individually and collectively denoted as API 112. The SDN applications can work on top of an abstraction of underlying network infrastructure (e.g., network devices in data plane 108), thereby considering the network as a single logical or virtual entity. API 112 may enable commercial enterprises/entities and operators or network operators to achieve public network services, such as routing, multicast, security, access control, bandwidth management, traffic engineering, QoS configuration, storage optimization, policy management, etc.

Figure 7:
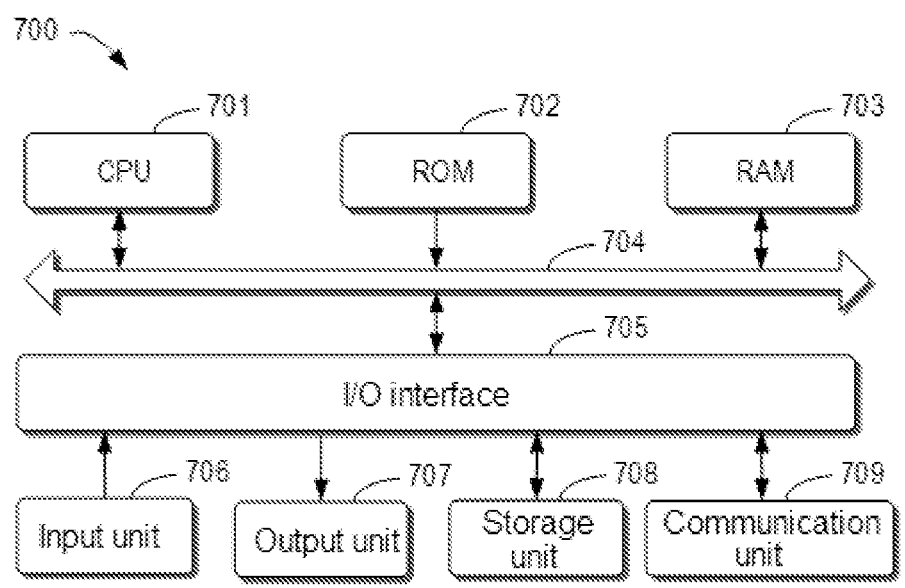
FIG. 7 illustrates a block diagram of an example device that may be used to implement some embodiments of the present disclosure.

As previously described, in an SDN architecture, network intelligence can be logically centralized in control plane 106, and control plane 106 may consist of one or more SDN controllers. In environment 100 of FIG. 1, one such SDN controller 110 is shown. However, in other embodiments, control plane 106 may include more SDN controllers and may operate in a distributed processing environment. SDN controller 110 may maintain a global view of an underlying network, thereby converting needs from application plane 104 down to network devices 114, 115, 116 and 117 in data plane 108, and providing SDN applications 103, 105, and 107 with an abstracted view of the network (possibly including network-related traffic statistical data and events). SDN controller 110 may allow network operators and administrators to detect a state of the network, change a network behavior in real time, and deploy new application programs and network services within hours or days. Therefore, according to an embodiment of the present disclosure, SDN controller 110 may provide services regarding security of an SDN network to a network administrator through a dynamic and automated SDN program such as an abnormality detection tool 102. In some embodiments, SDN controller 110 itself may be an information processing system, and program code that constitutes components such as abnormality detection tool 102 may be stored in a storage unit or memory in SDN controller 110. Other example architectural details of such an SDN controller 110 are shown in FIG. 7 and discussed below. In some embodiments, SDN controller 110 may be implemented in an electronic device with a computing capability, such as a personal computer, a workstation, a server, etc.

Abnormality detection tool 102 may be a software application program that includes program code that, when executed by a processor in SDN controller 110 or other suitable information processing systems implementing the function of SDN controller 110, may cause SDN controller 110 or the information processing systems to perform various operational tasks discussed below with reference to FIGS. 3 to 6. In some embodiments, abnormality detection tool 102 may be implemented in control plane 106, but not as a part of SDN controller 110. In this case, program code of abnormality detection tool 102 may be executed by SDN controller 110 or other suitable information processing systems in control plane 106 to cause SDN controller 110 or the information processing systems to perform various operational tasks discussed below with reference to FIGS. 3 to 6.

Data plane 108 may represent an infrastructure layer of an underlying communication network having an SDN architecture as illustrated in environment 100. As shown in the figure, in one embodiment, data plane 108 may include network devices 114 to 117 for forwarding data packets within and outside the network. For ease of description, only four network devices are shown in FIG. 1, but it can be understood that there may be hundreds or even more network devices constituting an actual data forwarding platform of the network. Herein, the terms "routing device" and "network device" may sometimes be used interchangeably. An example routing device or network device may include a network switch, a router, or any device with a data packet forwarding capability, and may be a physical device or a virtual machine-based virtual device.

As shown in FIG. 1, network devices 114 to 117 may be interconnected and also communicate with control plane 106 to perform forwarding of network traffic. Connections between the network devices in FIG. 1 are merely illustrative and do not imply that the connections shown are the only way for network devices 114 to 117 to be connected. In some embodiments, network devices 114 to 117 may communicate with SDN controller 110 in control plane 106 through respective control-data plane interfaces (also referred to as southbound interfaces). These control-data plane interfaces are collectively shown as control-data plane interface 120 in FIG. 1. Each interface 120 may be defined between control plane 106 and data plane 108 and may provide at least the following functions: control of all data forwarding operations, capability notifications of network devices, statistical data about traffic reported by the network devices to devices in the control plane, and notifications that the network devices report events to the devices in the control plane and receive events from the control plane.

In some embodiments, in order to report traffic statistical data, a traffic detector or a traffic detection program may be deployed on one or more of network devices 114 to 117 as a data sensing module. The data sensing module continuously detects a network status of the network device where it is located over time, and generates traffic statistical data about data packets it receives, processes, and forwards. The traffic statistical data may include information about flow table data, and the data packets' source address (e.g., IP address), destination address, duration, source port, destination port, protocol, network topology data, number of bytes, number of data packets, etc. These traffic statistical data may be sent to SDN controller 110 in control plane 106 for generating corresponding tensors, which are then used to determine whether there is an abnormality in the network.

Although example environment 100 is shown as an SDN network, embodiments of the present disclosure may also be implemented in different environments. For example, embodiments of the present disclosure may be implemented in other environments having an ability to collect and analyze network traffic data.

Figure 2A:
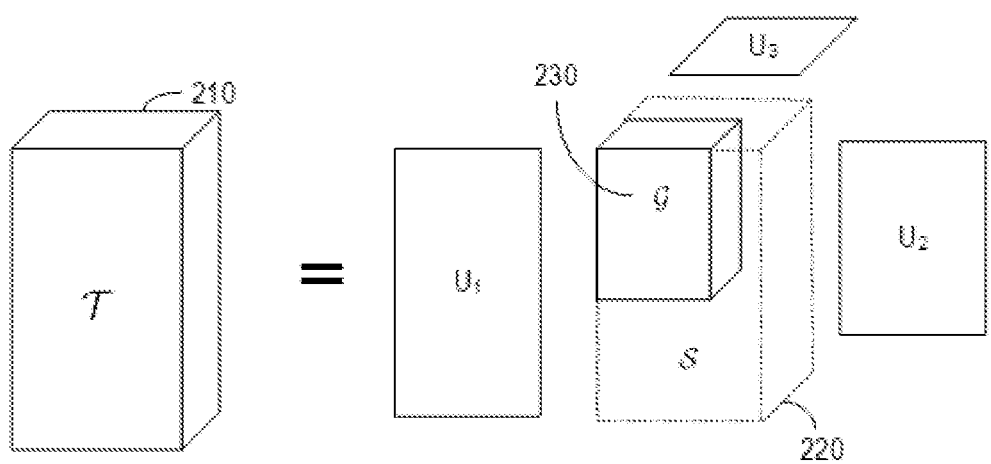
FIG. 2A illustrates a schematic diagram of tensor decomposition according to some embodiments of the present disclosure.

FIG. 2A illustrates a schematic diagram of tensor decomposition according to some embodiments of the present disclosure. As described above, multidimensional data may be represented as tensors. For ease of understanding, vectors are one-dimensional data, matrices are two-dimensional data, and tensors are three or more dimensional data herein.

For matrices, singular value decomposition is known. Using the form of a tensor-matrix product, the singular value decomposition can be expressed as:

$$M = \Sigma \times_1 U \times_2 V \qquad (1)$$

where matrix $\Sigma$ is a diagonal matrix, matrices U and V are orthogonal matrices, and operators $\times_1$ and $\times_2$ represent matrix products with respect to first dimensions (rows) and second dimensions (columns) of the matrices, respectively. Diagonal matrix $\Sigma$ obtained by singular value decomposition may be understood as a summary description of original matrix M, and for example, may be used for data compression and feature extraction of original matrix M. Herein, the singular value decomposition for two-dimensional matrices is generalized as decomposition for higher-dimensional tensors (also referred to as higher-order singular value decomposition, HOSVD). With reference to FIG. 2A, the decomposition can be expressed as:

$$\mathcal{T} = \mathcal{S} \times_1 U_1 \times_2 U_2 \times_3 U_3 = \mathcal{S} \times_{\{1,2,3\}} U_{\{1,2,3\}} \qquad (2)$$

where $\mathcal{T}$ is a decomposed original tensor, $\mathcal{S}$ is a diagonal tensor, $U_1$, $U_2$, and $U_3$ are decomposition factors of the decomposed tensor, respectively, operator $\times_{\{1,2,3\}}$ refers to sequentially performing matrix multiplication with respect to first, second, and third dimensions of the tensors, and $U_{\{1,2,3\}}$ is a combined notation representation of $U_1$, $U_2$, and $U_3$. As shown in FIG. 2A, core tensor $\mathcal{G}$ 230 of original tensor $\mathcal{T}$ 210 may be generated by intercepting a portion of the three dimensions of diagonal tensor $\mathcal{S}$ 220. In some embodiments, as a non-limiting example, a ratio of the length of each dimension of core tensor $\mathcal{G}$ 230 to the length of the corresponding dimension of original tensor $\mathcal{T}$ 210 may range from 20% to 50%.

It should be noted that in formula (2), decomposition factor $U_1$ is a decomposition factor related to the first dimension, and specifically, $U_1$ includes an orthogonal basis for a second dimensional space and a third dimensional space. Decomposition factor $U_2$ is a decomposition factor related to the second dimension, and specifically, $U_2$ includes an orthogonal basis for a first dimensional space and the third dimensional space. Decomposition factor $U_3$ is a decomposition factor related to the third dimension, and specifically, $U_3$ includes an orthogonal basis for the first dimensional space and the second dimensional space.

According to an embodiment of the present disclosure, core tensor $\mathcal{G}$ of tensor $\mathcal{T}$ may be considered as a feature of the original tensor, and thus, whether two tensors differ significantly is determined by comparing a difference between core tensors of the two tensors. When there is a significant difference, it can be considered that there is an abnormal condition in tensor data. A dynamic tensor filter according to an embodiment of the present disclosure is implemented based on a comparison of core tensors of tensors, and its implementation process will be explained below with reference to FIGS. 3 to 6.

Figure 2B:
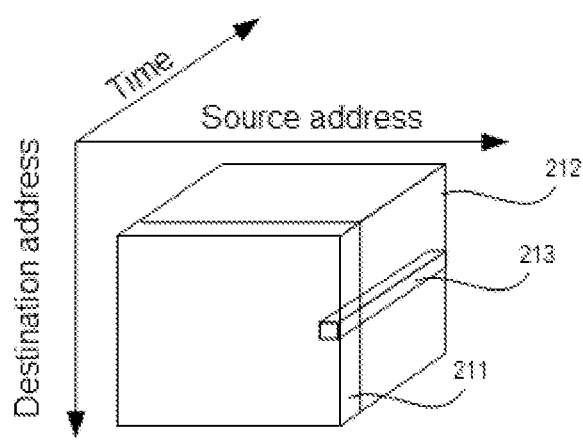
FIG. 2B illustrates a schematic diagram of a tensor representing traffic in a network according to some embodiments of the present disclosure.

FIG. 2B illustrates a schematic diagram of a tensor representing traffic in a network according to some embodiments of the present disclosure.

As described above, a data sensing module is deployed at one or more network devices 114 to 117 of data plane 108. The data sensing module may continuously send traffic sensing data to SDN controller 110 in control plane 106 over time. In some embodiments, the traffic statistical data may include a data packet's source address (e.g., IP address), destination address, duration, source port, destination port, protocol, network topology data, number of bytes, number of data packets, etc.

As time goes by, SDN controller 110 may continuously generate three-dimensional data, e.g., tensor 212 shown in FIG. 2B, based on the source address, destination address, and time of data packets in the received traffic statistical data. According to the time dimension, the tensor includes a series of time slices 211. The duration of a single time slice may be, for example, 5 seconds, 10 seconds, 30 seconds, 1 minute, 3 minutes, 5 minutes, etc. It should be understood that the duration of a single time slice above is for illustrative purposes only and does not limit the scope of the present disclosure. Time slice 211 in tensor 212 may include a two-dimensional matrix with respect to a source address dimension and a destination address dimension. In this matrix, a value of each unit may be the number of data packets sent from a network device at the corresponding source address to a network device at the corresponding destination address in this time slice. It will be understood, however, that values of the units in the matrix may be other traffic statistical data, such as the number of bytes or other similar statistical data. In addition, in tensor 212, the units in time slices 211 are formed as vector 213 over time. Each component in vector 213 indicates the number of data packets or bytes that a network device at the corresponding source address sends to a corresponding destination network device within one time slice.

A solution for detecting an abnormality in a network according to an embodiment of the present disclosure is described with reference to FIGS. 3 to 6. Before that, a dynamic filter according to an embodiment of the present disclosure is first outlined.

Considering the traffic statistical data whose features may vary over time, reference tensor $\mathcal{X}_{ref}$ obtained for the traffic statistical data should be updated accordingly over time. To model the dynamic features of tensor data, a state-observation model is provided, including:

State Model $$\mathcal{G}(t) = f_0(\mathcal{G}(t-1)) + \mathcal{P}_0(t)$$

$$U_{\{1,2,3\}}(t) = f_{\{1,2,3\}}(U_{\{1,2,3\}}(t)) + P_{\{1,2,3\}}(t) \quad (3)$$

Observation Model $$\mathcal{X}(t) = \mathcal{G}(t) \times_{\{1,2,3\}} U_{\{1,2,3\}(t)} + \mathcal{N}(t) \quad (4)$$

where $\mathcal{G}(t)$ is a feature of tensor $\mathcal{X}$ obtained at time t, and the feature may be represented with a core tensor of that tensor (described with reference to FIG. 2A); $U_{\{1,2,3\}}(t)$ is a decomposition factor of tensor $\mathcal{X}$, $f_{\{i\}}(\ ) = 0, 1, 2, 3$ is a conversion function, which may be linear or non-linear; and $\mathcal{P}_{\{i\}}(t)$, i=0, 1, 2, 3 and $\mathcal{N}(t)$ are respectively state noise and observation noise.

It should be understood that although it is difficult to determine a specific conversion function to capture all features of SDN traffic data, it is noted that detecting an abnormality in the traffic data does not need to accurately predict the traffic data, but just needs to discover statistical regularity of the traffic data. In addition, it is also noted that tensors derived from the traffic statistical data by moving a time window may be temporally overlapped, and a feature difference between adjacent tensors should be relatively small. That is, there may be an abnormality in the network if features of a later target tensor change significantly from those of a previous reference tensor.

Figure 3:
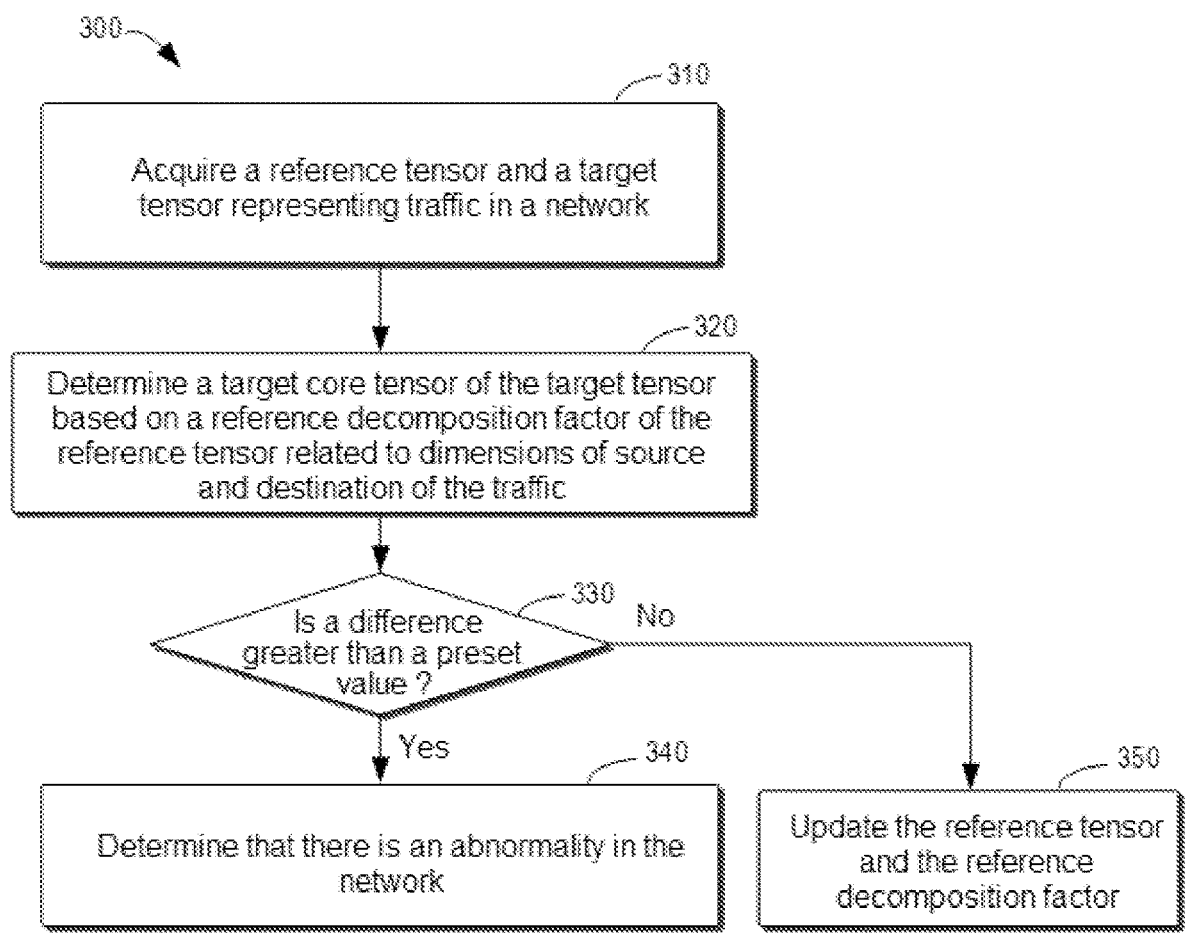
FIG. 3 illustrates a flow chart of a method for detecting an abnormality in a network according to some embodiments of the present disclosure.

FIG. 3 illustrates a flow chart of method 300 for detecting an abnormality in a network according to some embodiments of the present disclosure. Method 300 may be implemented, for example, in SDN controller 110 of FIG. 1.

At block 310, SDN controller 110 acquires reference tensor $\mathcal{X}_{ref}$ and target tensor $\mathcal{X}_p$ representing traffic in the network. In some embodiments, SDN controller 110 may generate reference tensor $\mathcal{X}_{ref}$ and target tensor $\mathcal{X}_p$ based on traffic statistical data from a data sensing module in a data plane. The generated reference tensor $\mathcal{X}_{ref}$ and target tensor $\mathcal{X}_p$ may be in the form of three-dimensional tensors described with reference to FIGS. 2A and 2B that have dimensions of source, destination, and time of the traffic. Here, the source of the traffic may be represented by a source IP address of data packets transmitted in the SDN network. The destination of the traffic may be represented by a destination IP address of the data packets. The time may be represented by a time slice to which the data packets belong. Values of elements in reference tensor $\mathcal{X}_{ref}$ and target tensor $\mathcal{X}_p$ may represent the number of corresponding data packets or the number of bytes, which is not limited in the present disclosure.

It should be understood that the tensors, i.e., the reference tensor and the target tensor, used to detect an abnormality in a network are not limited to three-dimensional data, but may have more dimensions. For example, they may have, e.g., a source port, a destination port, network topology information, etc. as additional dimensions.

Figure 4:
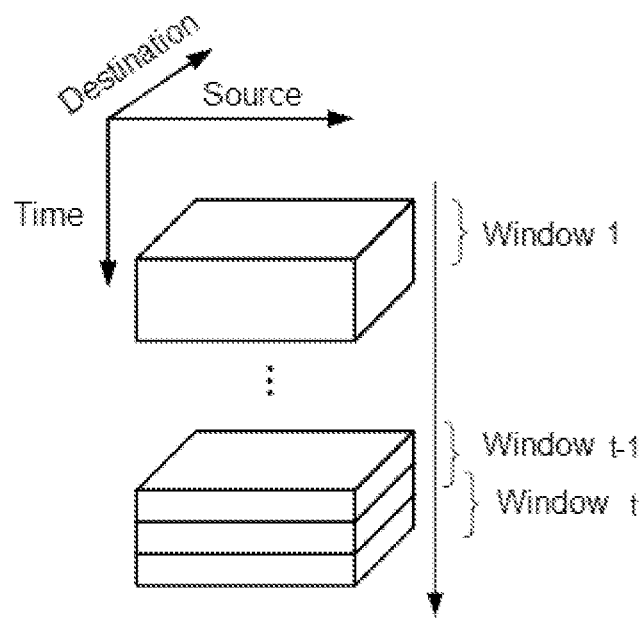
FIG. 4 illustrates a schematic diagram of tensor generation over time according to some embodiments of the present disclosure.

Target tensor $\mathcal{X}_p$ may be acquired based on reference tensor $\mathcal{X}_{ref}$. FIG. 4 illustrates a schematic diagram of tensor generation over time according to some embodiments of the present disclosure.

As shown in FIG. 4, an example tensor has three dimensions of source, destination, and time, where a series of tensors representing traffic in a network can be obtained over time. That is, the tensors are generated based on moving of a time window. For example, traffic statistical data of time window 1 is used to generate tensor 1, . . . , traffic statistical data of time window t–1 is used to generate tensor t–1, and traffic statistical data of time window t is used to generate tensor t. Here, the time windows may have the same number of time slices, e.g., 10, 20, 30, and 50 time slices. The duration of a time window herein, i.e., the number of time slices it includes, may also be referred to as slice length. In addition, as shown in FIG. 4, two adjacent tensors may have overlapping time slices. For example, the last one or more time slices of tensor t–1 also belong to tensor t.

SDN controller 110 may acquire traffic statistical data within a period of time (such as window t–1), and generate reference tensor $\mathcal{X}_{ref}$ by aggregating the traffic statistical data. Similarly, SDN controller 110 may also acquire traffic statistical data in a next period of time (window t), thereby generating target tensor $\mathcal{X}_p$.

As mentioned above, reference tensor $\mathcal{X}_{ref}$ and target tensor $\mathcal{X}_p$ may have overlapping time slices. Therefore, in order to acquire target tensor $\mathcal{X}_p$ more simply and to reduce the amount of data transmitted between data plane 108 and control plane 106, SDN controller 110 may acquire traffic statistical data in another period of time (also referred to as "step length") immediately after the period of time of reference tensor $\mathcal{X}_{ref}$ and generate incremental tensor $\mathcal{X}(t)$. Considering that reference tensor $\mathcal{X}_{ref}$ and target tensor $\mathcal{X}_p$ partially overlap, the length of this other time is shorter than that of the time window of reference tensor $\mathcal{X}_{ref}$. SDN controller 110 may then generate target tensor $\mathcal{X}_p$ based on reference tensor $\mathcal{X}_{ref}$ and incremental tensor $\mathcal{X}(t)$, e.g., by merging.

Still referring to FIG. 3, at block 320, SDN controller 110 determines target core tensor $\mathcal{G}(t)$ of target tensor $\mathcal{X}_p$ based on a reference decomposition factor of reference tensor $\mathcal{X}_{ref}$ related to dimensions of source and destination of the traffic. Target core tensor $\mathcal{G}(t)$ represents features of the target tensor.

First, decomposition factors $U_{\{1,2,3\}}$ related to the dimensions and reference core tensor $\mathcal{G}_{ref}$ of reference tensor $\mathcal{X}_{ref}$ are acquired by tensor decomposition. As an example, it is assumed that a first dimension, a second dimension, and a third dimension of a tensor are source, destination, and time, respectively. With reference to FIG. 2A again, the decomposition factor of reference tensor $\mathcal{X}_{ref}$ related to the dimension of source may be $U_1$, the decomposition factor related to the dimension of destination may be $U_2$, and the decomposition factor related to the dimension of time may be $U_3$.

In some embodiments, reference decomposition factor $U_{\{1,2\}}$ and target tensor $\mathcal{X}_p$ are used to determine decomposition factor $U_3(t)$ of target tensor $\mathcal{X}_p$ related to the dimension of time based on tensor decomposition. Here, reference decomposition factor $U_{\{1,2\}}$ is a decomposition factor related to the dimensions of source and destination in reference decomposition factors $U_{\{1,2,3\}}$ that have been obtained. Target core tensor $\mathcal{G}(t)$ is then determined based on target tensor $\mathcal{X}_p$, the decomposition factor $U_3(t)$ related to the dimension of time, and the reference decomposition factors $U_1$ and $U_2$.

At block 330, whether difference $\|\varepsilon\|_F$ between target core tensor $\mathcal{G}(t)$ and reference core tensor $\mathcal{G}_{ref}$ is greater than a preset value $Q$ is determined. In some embodiments, difference $\|\varepsilon\|_F$ may be a Frobenius norm of a tensor obtained by subtracting reference core tensor $\mathcal{G}_{ref}$ from target core tensor $\mathcal{G}(t)$. A Frobenius norm refers to a square root of a sum of squares of all elements in a tensor. In some embodiments, the preset value $Q$ may be determined based on a history of the difference over a period of time prior to acquiring target tensor $\mathcal{X}_p$. That is, the preset value $Q$ as a judgment criterion may dynamically change. For example, assuming that the difference satisfies a Gaussian distribution, the preset value $Q$ may be a value corresponding to 3 times a variance of the mean difference in the past period of time.

If difference $\|\varepsilon\|_F$ is greater than the preset value $Q$, then at block 340, SDN controller 110 determines that there is an abnormality in the network. For example, the network has been attacked.

If difference $\|\varepsilon\|_F$ is not greater than the preset value $Q$, then at block 350, SDN controller 110 updates reference tensor $\mathcal{X}_{ref}$ and reference decomposition factor $U_{\{1,2\}}$.

Figure 5:
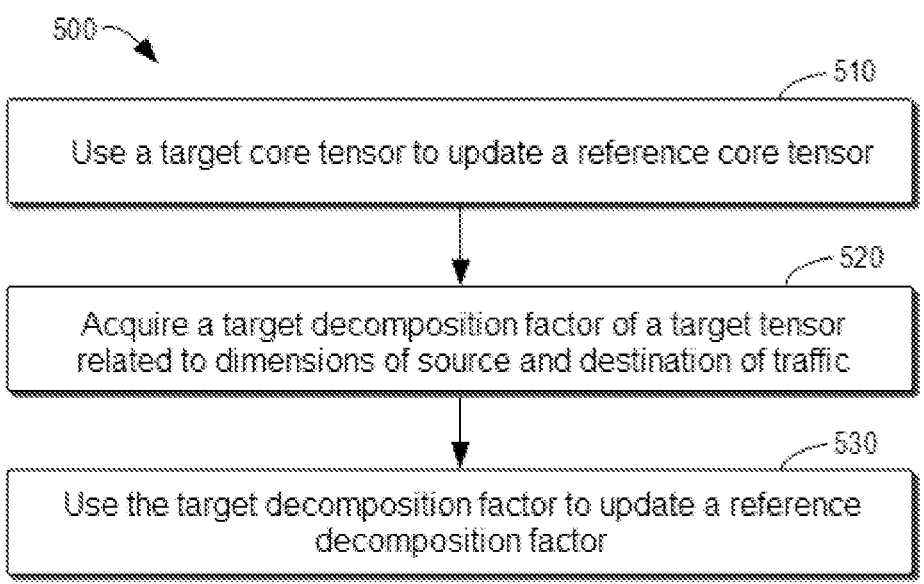
FIG. 5 illustrates a flow chart of a method for updating a reference tensor according to some embodiments of the present disclosure.

FIG. 5 illustrates a flow chart of method 500 for updating a reference tensor and a reference decomposition factor according to some embodiments of the present disclosure.

At block 510, reference core tensor $\mathcal{G}_{ref}$ is updated using target core tensor $\mathcal{G}(t)$. When no abnormality is detected, target core tensor $\mathcal{G}(t)$ may then be used as new reference core tensor $\mathcal{G}_{ref}$, and a core tensor of a next target tensor is compared with the target core tensor.

At block 520, target decomposition factor $U_{\{1,2\}}(t)$ of target tensor $\mathcal{X}_p$ related to dimensions of source and destination of traffic is acquired. In some embodiments, target decomposition factor $U_{\{1,2\}}(t)$ is determined based on target tensor $\mathcal{X}_p$ updated reference core tensor $\mathcal{G}_{ref}$ and decomposition factor $U_3(t)$ of the target tensor related to the dimension of time through tensor decomposition.

At block 530, reference decomposition factor $U_{\{1,2\}}$ is updated using target decomposition factor $U_{\{1,2\}}(t)$. In some embodiments, reference decomposition factor $U_{\{1,2\}}$ may be updated using a weighted sum of target decomposition factor $U_{\{1,2\}}(t)$ and reference decomposition factor $U_{\{1,2\}}$. For example, the weight may be determined according to the number of corresponding time slices. In this embodiment, target tensor $\mathcal{X}_p$ includes a portion of data that overlaps with reference tensor $\mathcal{X}_{ref}$ and incremental data $\mathcal{X}(t)$, and the weight may be proportional to the slice length of the overlapped data and the slice length of the incremental data. Therefore, the weight of an original reference decomposition factor may be (1−step length/slice length), and the weight of target decomposition factor $U_{\{1,2\}}(t)$ may be (step length/slice length).

After method 500 ends, the process returns to step 310 of method 300, so that SDN controller 110 repeatedly detects whether there is an abnormality in the network over time. The processes described above with reference to FIGS. 3 to 5 may be briefly represented by the following pseudo-code.

---
Algorithm 1: SO-HOSVD
---
Input : step size α; slice length β; data flow $\mathcal{X}$
Output: state s
Initialize: $\mathcal{X}_{ref}$ and corresponding factors $U_{\{1,2,3\}}$ ;γ = α/β
for each t step do
  | Get the new data and the expanded tensor $\mathcal{X}_p = \mathcal{X}_{ref} \cup \mathcal{X}(t)$
  | Decompose $\mathcal{X}_p$ with $U_{\{1,2\}}$ to get $U_3(t)$
  | Get core tensor $\mathcal{G}(t) = proj(\mathcal{X}_p; U_{\{1,2\}}, U_3(t))$
  | Get residual tensor ε(t)
  | if $\|\varepsilon\|_F \geq Q$ then
  | | s(t) = Attacked
  | else
  | | s(t) = Normal
  | | $\mathcal{G}_{ref} = \mathcal{G}(t)$
  | | Decompose $\mathcal{X}_p$ with $U_3(t)$ and $\mathcal{G}_{ref}$ to get $U_{\{1,2\}}(t)$
  | | $U_{\{1,2\}} = (1-\gamma)U_{\{1,2\}} + \gamma U_{\{1,2\}}(t)$
return It can be seen from the above description in conjunction with FIGS. 1 to 5 that the solution according to embodiments of the present disclosure utilizes network data in a tensor form to dynamically detect an abnormality in a network. This solution is more efficient and robust since tensors maintain intrinsic structural information of high-dimensional data. In addition, the solution can also be applied to data analysis for many scenarios with multidimensional data, such as traffic prediction and malicious device detection, but is not limited to detecting abnormalities in SDN networks.

Figure 6:
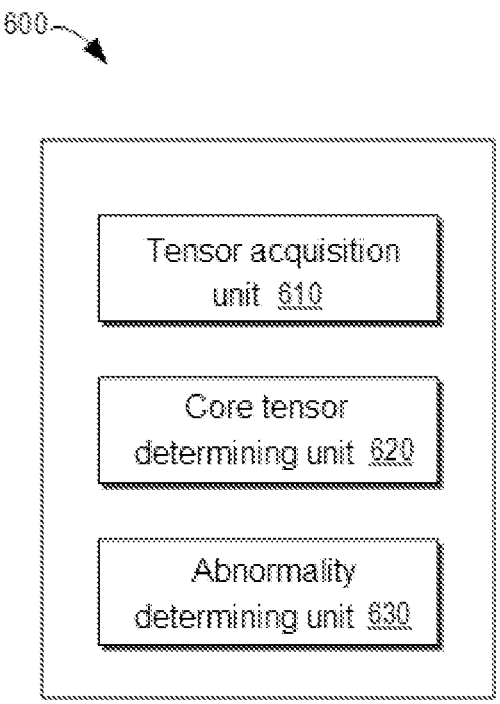
FIG. 6 illustrates a block diagram of an apparatus for detecting an abnormality in a network according to some embodiments of the present disclosure.

FIG. 6 illustrates a block diagram of apparatus 600 for managing a file according to an embodiment of the present disclosure. Apparatus 600 includes tensor acquisition unit 610, core tensor determining unit 620, and abnormality determining unit 630. Apparatus 600 may be implemented in an electronic device for implementing an SDN controller such as SDN controller 110 as shown in FIG. 1.

Tensor acquisition unit 610 is configured to acquire a reference tensor and a target tensor representing traffic within a network. The reference tensor and the target tensor have at least dimensions of source, destination, and time of the traffic.

In some embodiments, tensor acquisition unit 610 may be further configured to generate the reference tensor based on traffic statistical data of the network in a first period of time, where the traffic statistical data includes at least a source address and a destination address of a data packet. In some embodiments, tensor acquisition unit 610 may be further configured to generate an incremental tensor based on traffic statistical data of the network in a second period of time immediately following the first period of time, where the second period of time is shorter than the first period of time in length; and generate the target tensor based on the reference tensor and the incremental tensor.

Core tensor determining unit 620 is configured to determine a target core tensor of the target tensor based on a reference decomposition factor of the reference tensor related to the dimensions of source and destination of the traffic.

In some embodiments, core tensor determining unit 620 may be further configured to use a reference decomposition factor to decompose the target tensor to determine a decomposition factor of the target tensor related to the dimension of time; and determine the target core tensor based on the target tensor, the determined decomposition factor related to the dimension of time, and the reference decomposition factor.

Abnormality determining unit 630 is configured to determine that there is an abnormality in the network if a difference between the target core tensor of the target tensor and a reference core tensor of the reference tensor is greater than a preset value.

In some embodiments, apparatus 600 may further include an updating unit (not shown). The updating unit is configured to use the target core tensor to update the reference core tensor if the difference between the target core tensor and the reference core tensor is not greater than the preset value. In some embodiments, the updating unit may be further configured to use the updated reference core tensor and the decomposition factor of the target tensor related to the dimension of time to decompose the target tensor to acquire a target decomposition factor of the target tensor related to the dimensions of source and destination of the traffic; and use the target decomposition factor to update the reference decomposition factor.

In some embodiments, the updating unit may be further configured to update the reference decomposition factor using a weighted sum of the target decomposition factor and the reference decomposition factor.

In some embodiments, the difference comprises a Frobenius norm of a tensor obtained by subtracting the reference core tensor from the target core tensor.

In some embodiments, the preset value is determined based on a history of the difference over a period of time prior to acquiring the target tensor.

FIG. 7 illustrates a block diagram of example device 700 that may be used to implement some embodiments of the present disclosure. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to one another through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, for example, methods 300 and 500, may be performed by CPU 701. For example, in some embodiments, methods 300 and 500 may be implemented as a computer software program that is tangibly included in a machine-readable medium such as storage unit 708. In some embodiments, part of or all the computer program may be loaded and/or installed to device 700 via ROM 702 and/or communication unit 709. When the computer program is loaded into RAM 703 and executed by CPU 701, one or more actions of methods 300 and 500 described above can be implemented.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for detecting an abnormality in a software-defined network, comprising:
    acquiring, in a control plane of the software-defined network, a reference tensor and a target tensor representing traffic in a data plane of the software-defined network, the control plane being arranged between the data plane and an application plane of the software-defined network, the reference tensor and the target tensor having at least dimensions of source, destination, and time of the traffic, the target tensor being determined based on the reference tensor and an incremental tensor;
    determining in the control plane a target core tensor of the target tensor based on a reference decomposition factor of the reference tensor related to the dimensions of source and destination of the traffic, the target core tensor comprising a portion of the target tensor;
    determining in the control plane that there is an abnormality in the software-defined network responsive to a difference between the target core tensor of the target tensor and a reference core tensor of the reference tensor being greater than a preset value, the reference core tensor comprising a portion of the reference tensor; and
    responsive to the difference between the target core tensor of the target tensor and the reference core tensor of the reference tensor being less than the preset value, updating at least the reference tensor and the reference decomposition factor that is utilized to determine the target core tensor of the target tensor.

2. The method according to claim 1, wherein acquiring the reference tensor comprises:
    generating the reference tensor based on traffic statistical data of the software-defined network in a first period of time, the traffic statistical data at least comprising a source address and a destination address of a data packet.

3. The method according to claim 2, wherein acquiring the target tensor comprises:
    generating an incremental tensor based on traffic statistical data of the software-defined network in a second period of time immediately following the first period of time, the second period of time being shorter than the first period of time in length; and generating the target tensor based on the reference tensor and the incremental tensor.

4. The method according to claim 1, wherein determining the target core tensor of the target tensor comprises:
using the reference decomposition factor to decompose the target tensor to determine a decomposition factor of the target tensor related to the dimension of time; and
determining the target core tensor based on the target tensor, the determined decomposition factor related to the dimension of time, and the reference decomposition factor.

5. The method according to claim 1, further comprising:
using the target core tensor to update the reference core tensor responsive to the difference between the target core tensor and the reference core tensor being not greater than the preset value.

6. The method according to claim 5, further comprising:
using the updated reference core tensor and a decomposition factor of the target tensor related to the dimension of time to decompose the target tensor to acquire a target decomposition factor of the target tensor related to the dimensions of source and destination of the traffic; and
using the target decomposition factor to update the reference decomposition factor.

7. The method according to claim 6, wherein updating the reference decomposition factor comprises:
using a weighted sum of the target decomposition factor and the reference decomposition factor to update the reference decomposition factor.

8. The method according to claim 1, wherein the difference comprises a Frobenius norm of a tensor obtained by subtracting the reference core tensor from the target core tensor.

9. The method according to claim 1, wherein the preset value is determined based on a history of the difference over a period of time prior to acquiring the target tensor.

10. An electronic device, comprising:
at least one processing unit; and
at least one memory that is coupled to the at least one processing unit and stores instructions for execution by the at least one processing unit, wherein the instructions, when executed by the at least one processing unit, cause the electronic device to perform a method for detecting an abnormality in a software-defined network, the method comprising:
acquiring, in a control plane of the software-defined network, a reference tensor and a target tensor representing traffic in a data plane of the software-defined network, the control plane being arranged between the data plane and an application plane of the software-defined network, the reference tensor and the target tensor having at least dimensions of source, destination, and time of the traffic, the target tensor being determined based on the reference tensor and an incremental tensor;
determining in the control plane a target core tensor of the target tensor based on a reference decomposition factor of the reference tensor related to the dimensions of source and destination of the traffic, the target core tensor comprising a portion of the target tensor;
determining in the control plane that there is an abnormality in the software-defined network responsive to a difference between the target core tensor of the target tensor and a reference core tensor of the reference tensor being greater than a preset value, the reference core tensor comprising a portion of the reference tensor; and
responsive to the difference between the target core tensor of the target tensor and the reference core tensor of the reference tensor being less than the preset value, updating at least the reference tensor and the reference decomposition factor that is utilized to determine the target core tensor of the target tensor.

11. The electronic device according to claim 10, wherein acquiring the reference tensor comprises:
generating the reference tensor based on traffic statistical data of the software-defined network in a first period of time, the traffic statistical data at least comprising a source address and a destination address of a data packet.

12. The electronic device according to claim 11, wherein acquiring the target tensor comprises:
generating an incremental tensor based on traffic statistical data of the software-defined network in a second period of time immediately following the first period of time, the second period of time being shorter than the first period of time in length; and
generating the target tensor based on the reference tensor and the incremental tensor.

13. The electronic device according to claim 10, wherein determining the target core tensor of the target tensor comprises:
using the reference decomposition factor to decompose the target tensor to determine a decomposition factor of the target tensor related to the dimension of time; and
determining the target core tensor based on the target tensor, the determined decomposition factor related to the dimension of time, and the reference decomposition factor.

14. The electronic device according to claim 10, wherein the method performed by the electronic device further comprises:
using the target core tensor to update the reference core tensor responsive to the difference between the target core tensor and the reference core tensor being not greater than the preset value.

15. The electronic device according to claim 14, wherein the method performed by the electronic device further comprises:
using the updated reference core tensor and a decomposition factor of the target tensor related to the dimension of time to decompose the target tensor to acquire a target decomposition factor of the target tensor related to the dimensions of source and destination of the traffic; and
using the target decomposition factor to update the reference decomposition factor.

16. The electronic device according to claim 15, wherein updating the reference decomposition factor comprises:
using a weighted sum of the target decomposition factor and the reference decomposition factor to update the reference decomposition factor.

17. The electronic device according to claim 10, wherein the difference comprises a Frobenius norm of a tensor obtained by subtracting the reference core tensor from the target core tensor.

18. The electronic device according to claim 10, wherein the preset value is determined based on a history of the difference over a period of time prior to acquiring the target tensor.

19. The electronic device according to claim 10, wherein the at least one processing unit comprises:
- a tensor acquisition unit configured to acquire the reference tensor and the target tensor representing traffic in the software-defined network;
- a core tensor determining unit configured to determine the target core tensor of the target tensor based on the reference decomposition factor of the reference tensor related to the dimensions of source and destination of the traffic; and
- an abnormality determining unit configured to determine that there is an abnormality in the software-defined network responsive to the difference between the target core tensor of the target tensor and the reference core tensor of the reference tensor being greater than a preset value.

20. A computer program product comprising a non-transitory computer-readable storage medium storing machine-executable instructions that, when executed by a device, cause the device to perform a method for detecting an abnormality in a software-defined network, the method comprising:
- acquiring, in a control plane of the software-defined network, a reference tensor and a target tensor representing traffic in a data plane of the software-defined network, the control plane being arranged between the data plane and an application plane of the software-defined network, the reference tensor and the target tensor having at least dimensions of source, destination, and time of the traffic, the target tensor being determined based on the reference tensor and an incremental tensor;
- determining in the control plane a target core tensor of the target tensor based on a reference decomposition factor of the reference tensor related to the dimensions of source and destination of the traffic, the target core tensor comprising a portion of the target tensor;
- determining in the control plane that there is an abnormality in the software-defined network responsive to a difference between the target core tensor of the target tensor and a reference core tensor of the reference tensor being greater than a preset value, the reference core tensor comprising a portion of the reference tensor; and
- responsive to the difference between the target core tensor of the target tensor and the reference core tensor of the reference tensor being less than the preset value, updating at least the reference tensor and the reference decomposition factor that is utilized to determine the target core tensor of the target tensor.

* * * * *